United States Patent Office 3,359,245
Patented Dec. 19, 1967

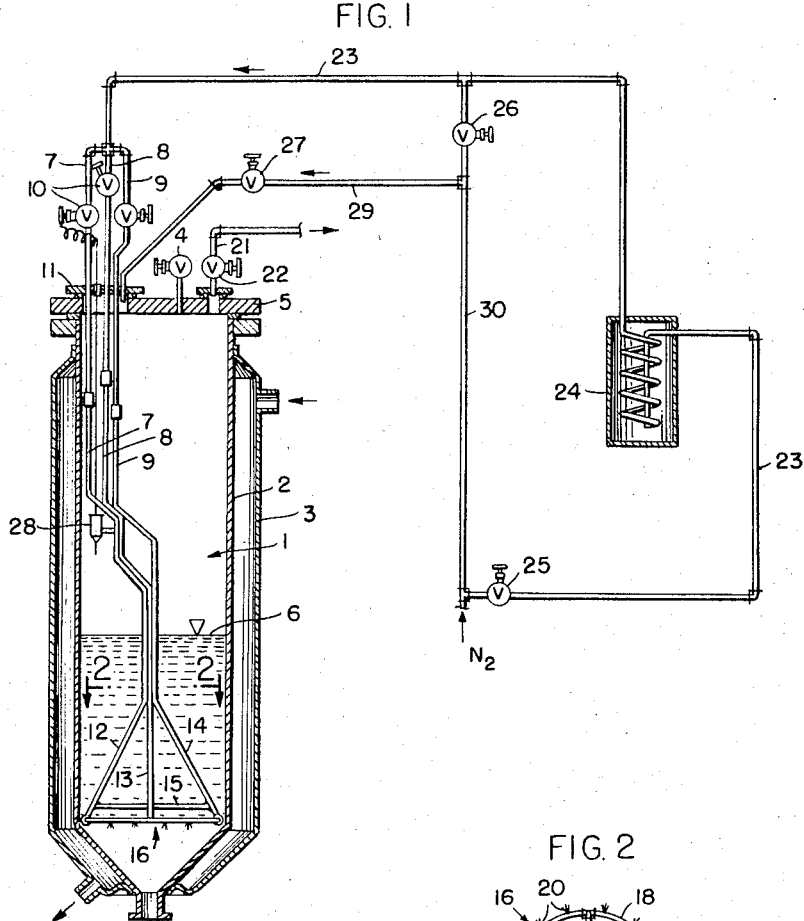
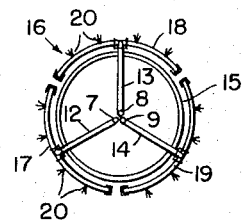

3,359,245
PROCESS FOR INCREASING SOLUTION VISCOSITY OF POLYAMIDE MELT
Ernst Meyer, Erlenbach am Main, Germany, assignor to Vereinigte Glanzstoff-Fabriken AG., Wuppertal-Elberfeld, Germany
Filed May 27, 1964, Ser. No. 370,431
Claims priority, application Germany, June 6, 1963, V 24,141
7 Claims. (Cl. 260—78)

ABSTRACT OF THE DISCLOSURE

Process for increasing solution viscosity of polyamide polycondensate melt still containing small amounts of water in the order of 0.1 to 1.0% made from alkylene diamines and saturated aliphatic carboxylic acid by feeding substantially dry nitrogen at 20–350° C. as a plurality of nitrogen streams near bottom of body of said melt and near outer edges of said body, e.g., from perforated ring or split ring in cylindrical autoclave having diameter of at least 70% of inner diameter of autoclave, to increase the solution viscosity of said melt to a value substantially above $\eta_{rel}$ 2.40.

This invention, in general, relates to condensation reactions to produce polyamides and apparatus useful therein.

The production of polyamides from dicarboxylic acids and diamines or their salts is accomplished, as is well known, by polycondensation of monomers under exclusion of oxygen. In the predominant part of the processes carried out on a technological scale, the work is done discontinuously by a batch method, for example, wherein an aqueous solution of the starting materials is heated to polyamide-forming temperatures in an autoclave under raised pressure until the polycondensate has achieved the desired properties. Since this first stage process step is carried out in a closed vessel from which the water cannot escape, only a polyamide with moderately high molecular weight is produced. In the subsequent pressure release of the reaction composite to normal pressure, the water distills off, whereby the reaction equilibrium is displaced in favor of the formation of amide groups and thereby for the formation of longer chains. A measure for the state of the polyamide is the solution viscosity, which, as is well known, within wide limits is directly proportional to the molecular weight. A polyamide of adipic acid-hexamethylene diamine salt (AH salt), which has been produced according to the above-described, known process, still has after completion of the pressure release a water content of about 0.5 to 1% and a solution viscosity of $\eta_{rel}$ about 1.8 to 2. This product is not yet suited for filament production.

In order to raise the solution viscosity an additional treatment of the polycondensate has to be carried out, in which the residual amount of water is removed and a further condensation takes place. For this purpose, the polyamide in a molten state is washed at about 270 to 275° C. with nitrogen by conducting a current of nitrogen over the melt. Under normal conditions it is possible by this measure to count on raising the solution viscosity to a maximal value of $\eta_{rel}=2.4$.

Since it has been ascertained that polyamides with relatively high solution viscosity—assuming that they are not otherwise damaged—can be processed into filaments, etc., with especially good properties with respect to strength and stretching capacity, an effort is made to conduct the polycondensation over-all in such a way that the end product has a solution viscosity as high as possible.

If, however, an attempt is made to reach this goal by a method such that the nitrogen washing is continued over a longer time or executed at higher temperatures, thermal damage to the polycondensate takes place.

Since the temperature sensitivity of the polyamides prohibits a treatment of a time longer than the absolutely necessary time, it is necessary to strive to bring about the raising of the solution viscosity by a more rapid removal of the residual amount of water. In the above described washing of the polyamide melt by passage of a nitrogen stream over it, self-evidently only a certain amount of water can be removed per time unit, which water evaporates from the surface of the melt. By agitation, water removal can be accelerated because new reaction matter is always brought to the surface, but it is not possible to achieve a solution viscosity $\eta_{rel}$ of more than 2.40. Experiments have been carried out by introducing the nitrogen current into the melt and, namely, in such a way that it emerges just above the bottom of the autoclave and flows through the melt in its entire height. This measure, however, did not lead to marked success either.

It is found surprisingly, in accordance with this invention, that the raising of the solution viscosity of polyamides of dicarboxylic acids and diamines or their salts can be achieved if nitrogen, heated to 20 to 350° C., is introduced into the polyamide melt (previously polycondensed in a usual manner under raised pressure and then released to normal pressure) in such a way that the nitrogen emerges in a plurality of streams at a short distance from the outer wall of the autoclave.

For the execution of the process there is used expediently an apparatus which comprises nitrogen feed lines connected to a perforated ring slightly above the bottom of the autoclave. The outer diameter of the ring is only a little smaller than the inside diameter of the autoclave. In detail, the diameter of the ring will be selected according to the size of the autoclave. Thus, the distance from the radially outer side of the ring to autoclave inside wall may, for example, amount to as little as only 5 mm. The diameter of the ring, however, may be as small as 70% of the autoclave inner wall diameter.

Under this nitrogen introduction system, the melt convection is increased, and the dehydration of the reaction composite is accelerated considerably. A further advantage achieved is a reduction of the thermal damage to the polyamide.

The invention, its objectives, advantages and functions, will be further appreciated and understood from the following specific embodiments thereof taken in conjunction with the drawings.

In the drawings:
FIG. 1 is a schematic view, with an autoclave shown in section, of a preferred form of the apparatus; and
FIG. 2 is a top plan view of a perforate ring used in the autoclave of FIG. 1.

The apparatus comprises an autoclave 1 having a cylindrical wall 2 which is enclosed by a heating jacket 3. A pressure release valve 4 in the cap or cover plate 5 sealing the upper end of the autoclave makes possible a pressure balancing after completion of polycondensation which is carried out in a usual manner. The reaction composition preferably fills the autoclave to about 40% of capacity. The line 6 indicates the melt level at this percent. The feed of the nitrogen into the melt is done through separate pipes 7, 8 and 9, each having a valve 10. Pipes 7, 8 and 9 extend downwardly into the autoclave through the sealed cap 11 and through the main portion of the autoclave. They branch into pipe branches 12, 13 and 14 having a tripod arrangement, the lower ends of which may be braced together by ring brace 15.

Pipe branches 12, 13 and 14 are connected to and communicate with a perforated, distributor ring 16 near the bottom of the autoclave, which ring is subdivided into three, equal-sized curved sections 17, 18 and 19 of about 120° arc.

One of each pipe branches 12, 13 and 14 is connected to one of the sections 17, 18 and 19. The nitrogen is discharged from the sections through small openings 20 in each section in the form of a plurality of nitrogen streams spaced circularly near the inner wall of the autoclave.

The nitrogen, upon passing upwardly through the melt, becomes laden with water and passes out of the autoclave through pipe 21 having valve 22.

The polyamide polymerizate, after completion of the condensation reaction, can be forced out through the discharge opening 23. In order to prevent the nitrogen feed lines and/or perforate ring from becoming clogged in the pressing of the melt out of the autoclave, there may be provided pressure balance in the nitrogen lines.

Nitrogen pipes 7, 8 and 9 is fed by pipe 23 having a nitrogen preheater 24 from the indicated pressurized nitrogen source when valve 25 is open and valves 26 and 27 are closed. When valve 25 is closed and valve 27 in branch pipe 29 is opened, nitrogen pressure is exerted on the melt in the autoclave. Valve 26 in pipe 30 can also be opened to provide the equalizing nitrogen pressure in pipes 7, 8 and 9 and in the distributor ring 16, assuming valves 10 to be also open. Under these conditions, polyamide melt is not forced into the ring 16 and connecting pipes.

Expediently there is mounted in the autoclave an electrode 28. It acts as level indicator, but only when, through foaming of the melt, it would rise to a height of about 65% of the autoclave content. In a normal operation of the process of the invention, however, this does not happen.

The process and its advantages are illustrated in the following examples, in which reference is made to the drawings.

*Example I*

In a closed autoclave 1, which is surrounded by a heating jacket 3, a 65% by weight adipic acid-hexamethylene diamine salt solution is heated in known manner until the pressure has risen to 18 atmospheres gauge. The reaction composition is maintained under these conditions for one hour, and thereupon valve 4 is opened so that an expansion to normal pressure occurs, and the main amount of the water escapes. The melt fills the autoclave to about 40% (melt level 6) and has a temperature of 260 to 300° C. The residual water content amounts to 0.1 to 1%, and the solution viscosity to $\eta_{rel}=1.9$.

The process of the invention is now carried out in such a way that through the lines 7, 8 and 9 nitrogen heated to about 200° is introduced in an amount of 250 liters/hr. into the autoclave. The emergence of the gas stream into the melt takes place through a large number of openings 20 in the ring 16 subdivided into three curved sections of about 120° arc, the outer diameter of which is only slightly less than the inside diameter of the autoclave. The nitrogen rises in the immediate proximity of the autoclave wall and, laden with water, is discharged through the pipe 21. After 45 minutes, the nitrogen washing is ended. The valve 22 is closed, and valves 27 and 26 are opened, so that in the lines and in the autoclave chamber a pressure equality prevails. The autoclave is now placed under a pressure of 1 to 10 atmospheres excess pressure, and the melt is pressed through the opening.

The polyamide has a solution viscosity of $\eta_{rel}=2.53$ to 2.57 and is not thermally damaged.

If the process is conducted in the same way but smaller amounts of nitrogen of 25 liters/hr. or higher amounts of nitrogen of up to about 1500 liter/hr. are introduced, no difference is found in the polyamide solution viscosity. Neither does any thermal damage occur.

*Example II*

This example illustrates results obtained with a known process for nitrogen washing. The condensation is carried out under the same conditions as in the preceding example, and pressure is released to normal. Then a nitrogen washing is carried out by conducting across the surface of the melt a nitrogen stream of 200 liters/hr. for 45 minutes fed through pipe 29 and discharged through pipe 21. After completion of washing, the autoclave is emptied as described above. The solution viscosity of the polyamide amounts to $\eta_{rel}=2.40$.

If the same procedure is followed, but a conisderably greater amount of nitrogen of 1500 liters/hr. is used, practically no rise of the solution viscosity is achieved ($\eta_{rel}=2.41$).

*Example III*

This example illustrates results obtained with a known process for nitrogen washing. After completion of the polycondensation and pressure release to normal pressure as described above, nitrogen is introduced through a feed line extending centrally through the autoclave and ending shortly above the bottom of the autoclave. The nitrogen is preheated to 200° C. as described in Example I. In order to obtain nitrogen bubbles, a discontinuous nitrogen stream is introduced, the feed being interrupted by means of a solenoid valve at 2 second flow intervals between 2 second interruptions. The total nitrogen feed amounts to 300 liters/hr. After 45 minutes of nitrogen washing, a solution viscosity of the polyamide of $\eta_{rel}=2.40$ is measured. Even with more intense nitrogen introduction of 750 and 1500 liters/hr., a higher solution viscosity is not achieved.

*Example IV*

Example III is repeated without change, but the nitrogen washing time is extended to 100 minutes. Hereby there is achieved a rise of the solution viscosity of the polyamide to $\eta_{rel}=2.55$. The polycandensate, however, is extremely brownish and bubbly.

*Example V*

This example illustrates results obtained with a known process for nitrogen washing. The polycondensation is carried out according to Example I. After pressure release to normal pressure, there are first introduced for 40 minutes about 750 liters of $N_2$ per hour through central capillaries into the melt and thereupon about 1000 liters $N_2$ per hour for 40 minutes over the melt. The solution viscosity under these conditions cannot be raised beyond a value of $\eta_{rel}=2.41$. Moreover, here too, there is obtained a brownish, bubbly polycondensate.

Polyamide samples which were produced according to Example I and according to the known procedures of Examples II–V are melted up in a manner in itself known by means of an extruder and spun. The threads are stretched at 185° C. They have a denier of 210 den. with 36 individual threads. The following values were determined:

| Example | Extension, percent | Strength, g./den. | Whiteness [1] | Thermal Damage | |
|---|---|---|---|---|---|
| | | | | UV, 290 m$\mu$ | Ehrlich 565 m$\mu$ |
| I | 17 | 8.24 | 75.6 | 0.078 | 0.045 |
| II | 17 | 8.03 | 62.7 | 0.150 | 0.105 |
| III | 17 | 8.00 | 65.3 | [2] | [2] |
| IV | Unspinnable | | 53.8 | [2] | [2] |
| V | Unspinnable | | [2] | [2] | [2] |

[1] The whiteness determination was carried out on polyamide cuttings.
[2] Not determined.

The degree of whiteness was determined according to the method of Stephansen (H. S. Selling and L. C. F.

Friele, Appl. Sci. Res. B1 (1950), p. 453) according to the equation:

$$W = 2B - R$$

$W$ = degree of whiteness
$B$ = remission at 460 m.
$R$ = remission at 620 m.

The thermal damage was determined by UV measurements at 290 m$\mu$ and with Ehrlich reagent at 565 m$\mu$. (See Determination Method in J. Goodman, J. Pol. Sci., 13 (1954), p. 175.)

The solution viscosities given in the examples were measured on 1% solutions of the polyamides in 90% formic acid at 25° C. in a capillary viscosimeter (diameter of the capillaries 0.8 mm., length of the capillaries 100 mm.), calculation of the values according to the formula Solution viscosimeter $\eta_{rel} =$ $$\frac{\text{Throughput time of the solution}}{\text{Throughput time of the solvent}}$$

The process is of present, primary, commercial importance in the production of nylon 66, a linear condensate of adipic acid and hexamethylene diamine. It applies, however, to polyamides similarly produced from saturated, aliphatic acids having 4–12 carbons and alkylene diamines having 4–12 carbons. The initial condensation is of the diamines and dicarboxylic acids and their salts and is conducted by heating according to known practice to about 260° C. to 300° C. with a pressure build-up in the autoclave to about 18 atmospheres gauge. After flashing off the steam, about 0.1 to 1% water remains in the polyamide melt. This water is removed by the nitrogen washing procedure of the invention with the melt at an initial temperature of about 260–300° C. and with nitrogen preheated to about 20–350° C. for a period of about 15–60 minutes at a nitrogen feed rate of about 25 to 1500 liters per hour. The period of nitrogen washing and the nitrogen temperature are selected to attain a relative viscosity as aforedefined above about 2.40, preferably one about 2.50 or above, without adverse damage to the polyamide by maintaining it at too high a temperature for too long a period.

The invention is hereby claimed as follows:

1. A process for increasing the solution viscosity of a linear polyamide melt containing a small amount of water, said polyamide being the polyamide polycondensate of an alkylene diamine and a saturated, aliphatic dicarboxylic acid, which process comprises feeding substantially dry nitrogen preheated to about 20 to 350° C., into a body of said melt in a plurality of nitrogen streams introduced near the bottom of said body at spaced intervals near the outer edges of said body at a minimum distance from the center of said body to said streams which is at least 70% of the distance from the center of said body to said outer edges thereof for a period of time sufficient to raise the solution viscosity of said polyamide melt to a value substantially above $\eta_{rel}$ 2.40, measured on a 1% solution of said polyamide in 90% formic acid at 25° C.

2. A process as claimed in claim 1 wherein said polyamide melt is raised to a value about $\eta_{rel}$ 2.50.

3. A process as claimed in claim 1 wherein said polyamide is a polycondensate of hexamethylene diamine and adipic acid.

4. A process as claimed in claim 1 wherein said nitrogen streams are introduced closely adjacent said outer edges of said body.

5. A process as claimed in claim 1 wherein the minimum viscosity of the initial polamide melt is $\eta_{rel}$ of about 1.8 measured on a 1% solution of said polyamide in 90% formic acid at 25° C.

6. A process as claimed in claim 1 wherein said melt is a cylindrical body of melt and said streams are discharged at closely spaced intervals in a circular arrangement.

7. A process as claimed in claim 1 wherein said small amount is about 0.1 to 1% water.

References Cited

UNITED STATES PATENTS

| | | |
|---|---|---|
| 2,731,081 | 1/1956 | Mayner. |
| 2,867,805 | 1/1959 | Ludewig. |
| 3,047,565 | 7/1962 | Braun et al. |
| 3,109,835 | 11/1963 | Apostle et al. |

WILLIAM H. SHORT, *Primary Examiner.*

H. D. ANDERSON, *Assistant Examiner.*